United States Patent
Lin et al.

(10) Patent No.: US 8,023,060 B2
(45) Date of Patent: Sep. 20, 2011

(54) FLEXIBLE DISPLAY

(75) Inventors: Yao-Sheng Lin, Chiayi (TW); Tai-Hong Chen, Taipei County (TW); Su-Yu Fun, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 453 days.

(21) Appl. No.: 11/926,113

(22) Filed: Oct. 28, 2007

(65) Prior Publication Data

US 2008/0198541 A1    Aug. 21, 2008

(30) Foreign Application Priority Data

Feb. 16, 2007  (TW) .............................. 96106083 A

(51) Int. Cl.
    *G02F 1/1333*    (2006.01)
(52) U.S. Cl. ....................................................... 349/58
(58) Field of Classification Search .................. None
    See application file for complete search history.

(56) References Cited

U.S. PATENT DOCUMENTS

| 6,633,349 B2 * | 10/2003 | Fujishiro ........................ 349/58 |
| 6,762,929 B2 | 7/2004 | Sawyer |
| 2004/0183958 A1 * | 9/2004 | Akiyama et al. ................ 349/58 |
| 2005/0040962 A1 | 2/2005 | Funkhouser et al. |

FOREIGN PATENT DOCUMENTS

TW    I272009    1/2007

OTHER PUBLICATIONS

"Office Action of Taiwan counterpart application", issued on Mar. 23, 2010, p. 1-p. 4.

* cited by examiner

*Primary Examiner* — Lucy P Chien
(74) *Attorney, Agent, or Firm* — Jianq Chyun IP Office

(57) ABSTRACT

A flexible display including a flexible display panel and a flexible hollow supporting structure is provided. The flexible display panel has a first end and a second end opposite to each other. The flexible hollow supporting structure is integrated with the flexible display panel and extends from the first end to the second end of the flexible display panel. In addition, a supporting medium can be infused into the flexible hollow supporting structure so as to stretch and support the flexible display panel.

21 Claims, 10 Drawing Sheets

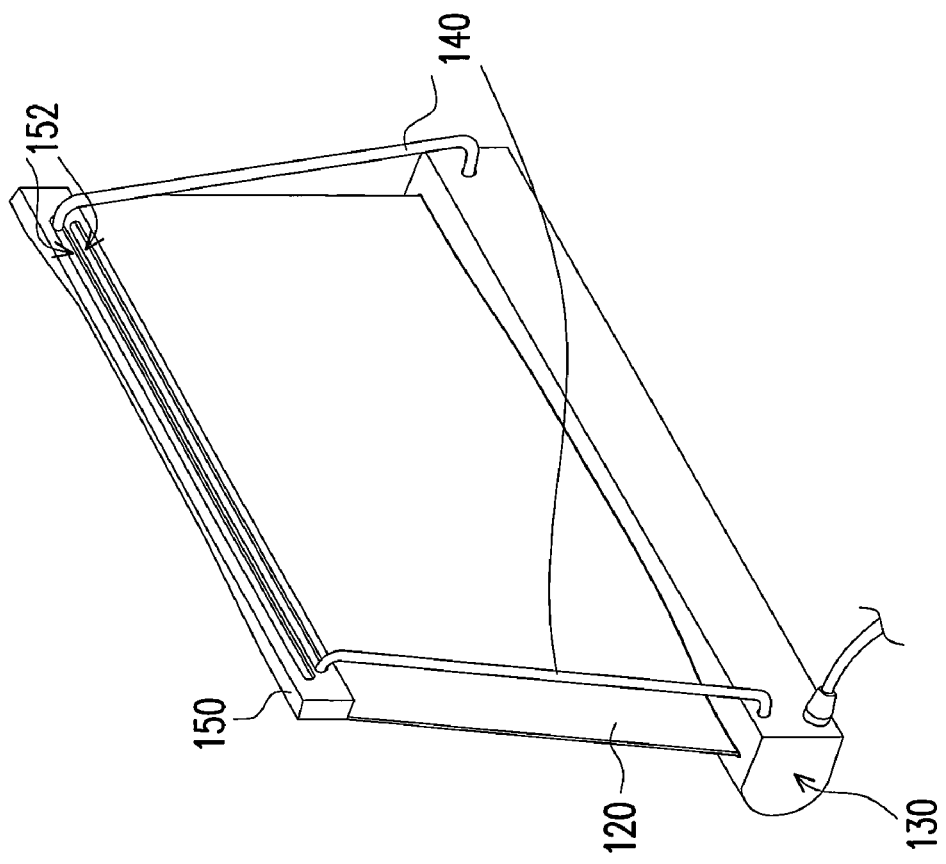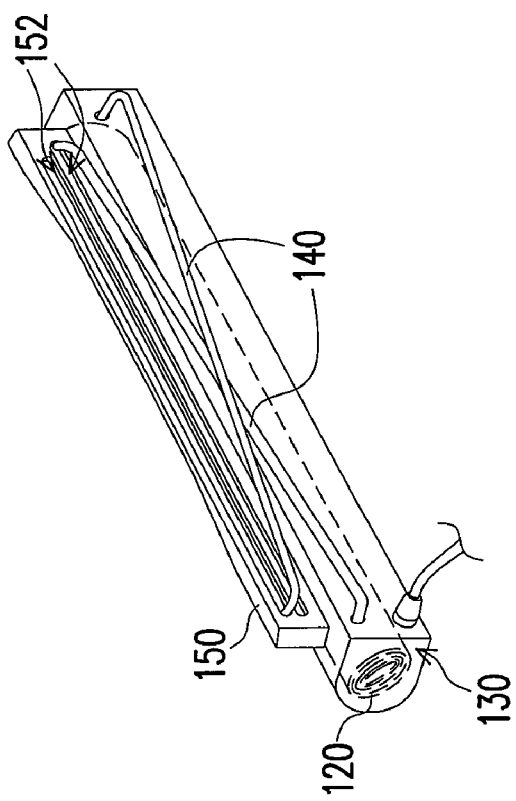
FIG. 1B (PRIOR ART)

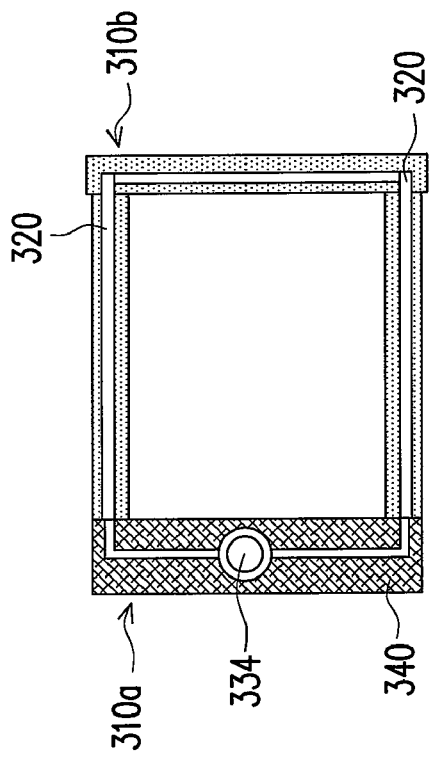
FIG. 4A
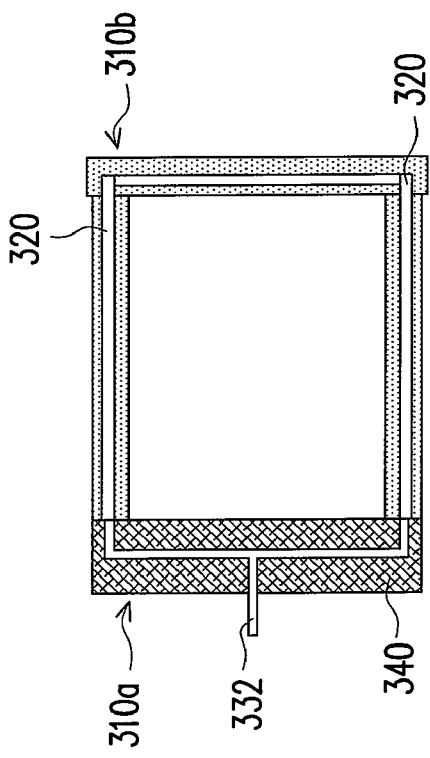
FIG. 4C
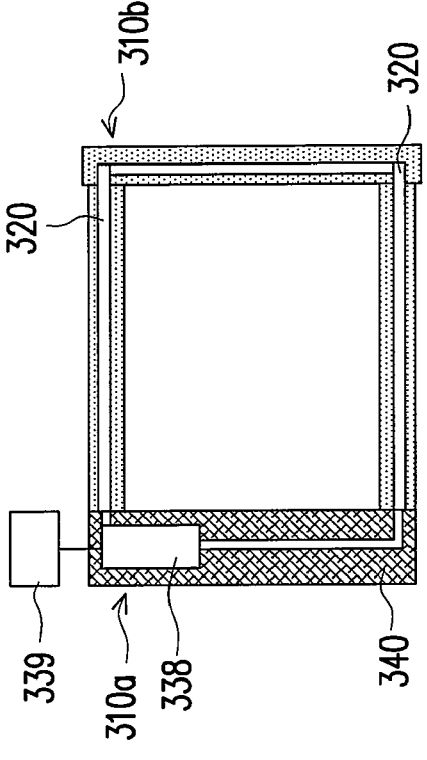
FIG. 4B
FIG. 4D

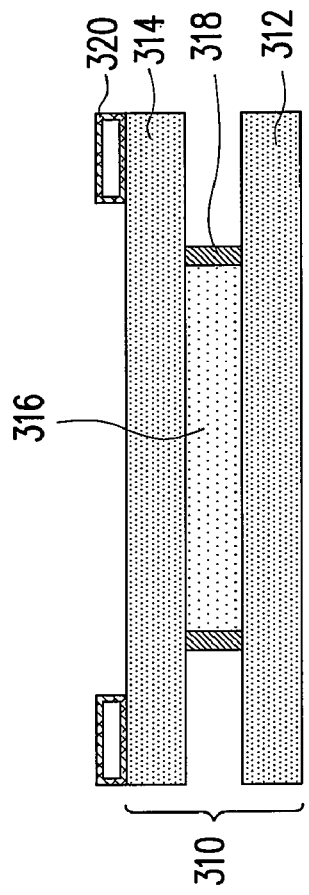
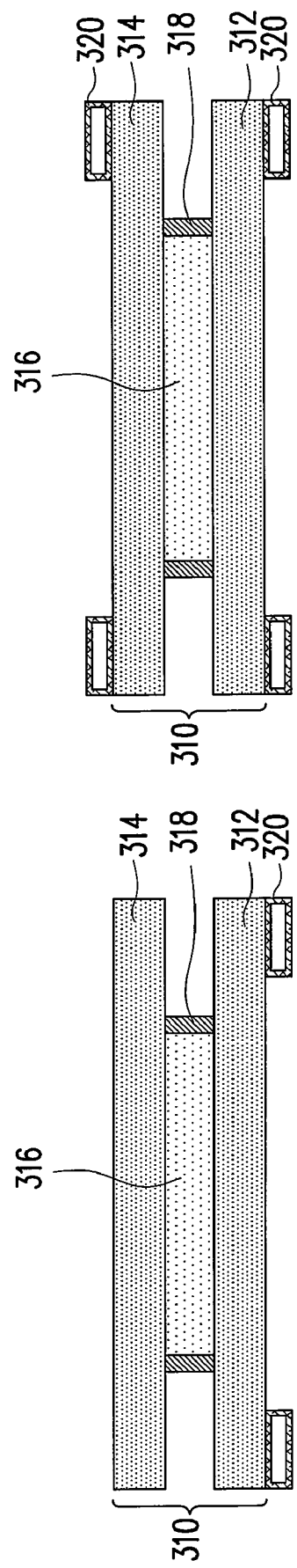
FIG. 6A
FIG. 6B
FIG. 6C

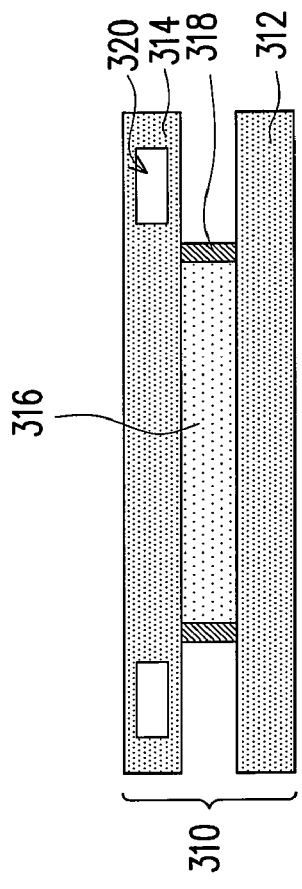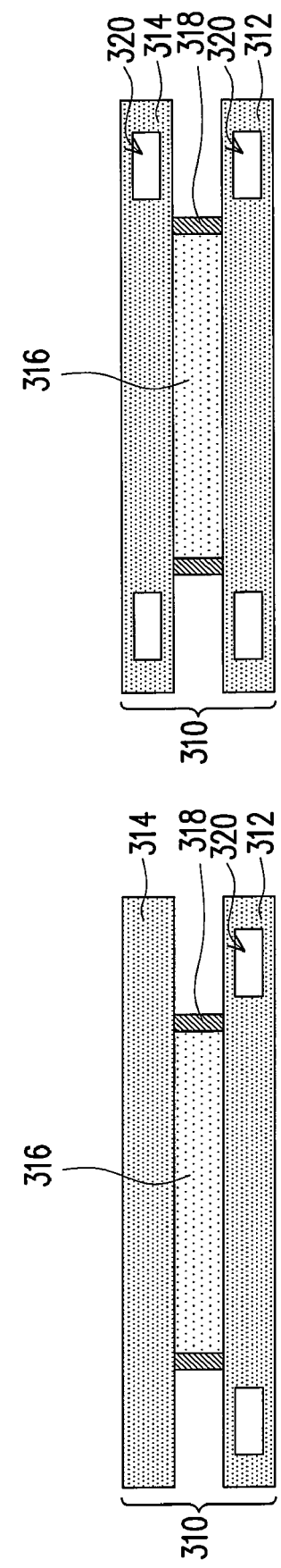

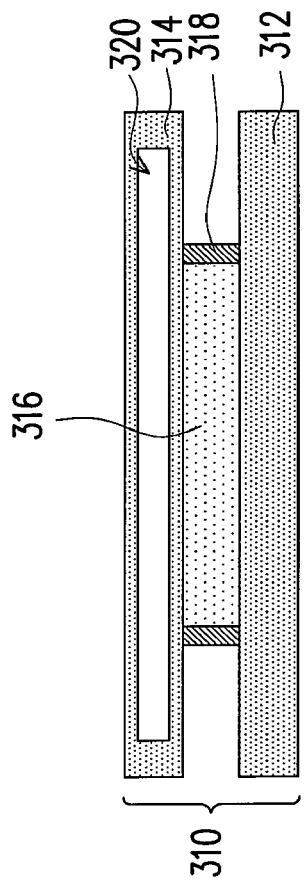
FIG. 8A
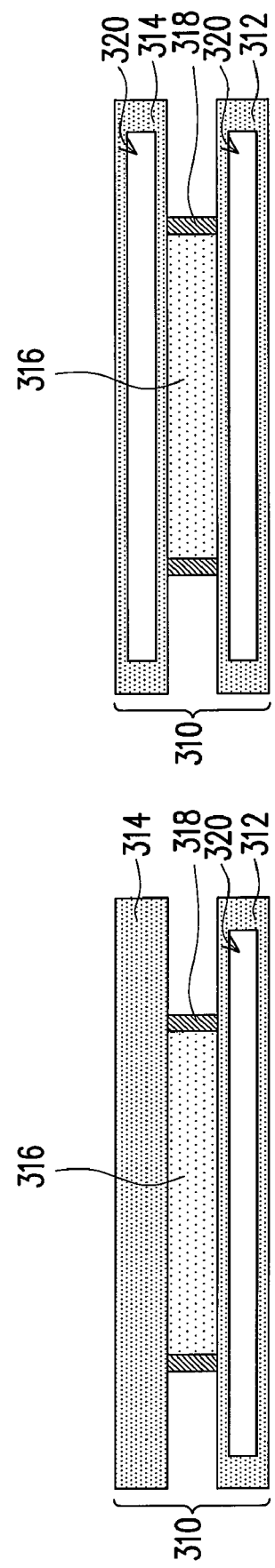
FIG. 8B
FIG. 8C

FLEXIBLE DISPLAY

CROSS-REFERENCE TO RELATED APPLICATION

This application claims the priority benefit of Taiwan application serial no. 96106083, filed on Feb. 16, 2007. All disclosure of the Taiwan application is incorporated herein by reference.

BACKGROUND OF THE INVENTION

1. Field of the Invention

The present invention generally relates to a flexible display.

2. Description of Related Art

Different types of displays have been developed along with the advancement of fabricating techniques. Due to the requirements to displays of lightness, sliminess, shortness, smallness, and portability, the design of displays of the next generation is going towards to high flexibility and portability. Generally speaking, a flexible display can be rolled or folded up when it is not in use so that the display can be carried everywhere conveniently. However, the flexible display may have low stability regarding its performance due to its flexibility, and a user has to support the display with his hands or a bracket while using the display.

The current method for supporting a flexible display with a user's hands brings a lot of inconvenience to the user, and the method of using a bracket to support a flexible display increases the weight and volume of the display and makes the structure design of the display very complicated.

As shown in FIGS. 1A and 1B, a display support apparatus is disclosed in U.S. Pat. No. 6,762,929. The display support apparatus is applied to a computer 110. While not in use, the flexible display panel 120 is rolled up and stored in a chamber 130 behind the computer 110. The user pulls the flexible display panel 120 out when the user wants to use the computer 110, wherein two metal brackets 140 are disposed behind the flexible display panel 120, and the brackets 140 are moved along the sliding tracks 152 on the frame 150 of the flexible display panel 120 to a determined position for supporting the flexible display panel 120, so that the user can look at the flexible display panel 120 conveniently. According to such design, the frame 150 around the flexible display panel 120 has to be intensified to be supported by the metal brackets 140, while long-time or frequent usages may still cause the brackets 140 and the frame 150 to be worn out. Besides, the metal brackets 140 are difficult to be assembled, and which also increase the weight and volume of the product.

In addition, as shown in FIG. 2, a retractable flexible digital display apparatus is disclosed in U.S. Patent No. 20050040962. This flexible display has a storage space 210 and a retracting device 220 for retracting the flexible display panel. To use the flexible display, the retracting device 220 is controlled to release the flexible display panel 230, while to retract the flexible display, the retracting device 220 is used for retracting the flexible display panel 230 into the storage space 210. Such design is similar to the typical design of a projection screen; however, because there is no supporting structure provided after the flexible display panel 230 is released, additional brackets are required for supporting the flexible display panel 230.

SUMMARY OF THE INVENTION

Accordingly, the present invention is directed to a flexible display which has simple structure and is easy to be fabricated, and the flexible display can be easily stored and used.

As embodied and broadly described herein, a flexible display including a flexible display panel, a flexible hollow supporting structure, and a medium infusing device is provided. The flexible display panel has a first end and a second end opposite to each other. The flexible hollow supporting structure is integrated with the flexible display panel and extends from the first end to the second end of the flexible display panel. In addition, a supporting medium can be infused into the flexible hollow supporting structure to stretch and support the flexible display panel.

The flexible display in the present invention may further include a medium infusing device connected to the flexible hollow supporting structure, and the medium infusing device is used for infusing the supporting medium into the flexible hollow supporting structure so that the flexible hollow supporting structure can support the flexible display panel.

According to the present invention, no additional supporting device is required for supporting a flexible panel; instead, a supporting medium is used for stretching a flexible hollow supporting structure, so as to support the flexible display panel. Accordingly, the flexible display has simpler structure and is easy to be fabricated and used. Moreover, according to the present invention, the fabrication process of the flexible hollow supporting structure can be integrated with the fabrication process of the flexible display panel so that the fabrication process of the flexible display is simplified and the fabrication cost thereof is reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 1A and 1B illustrate a conventional display supporting apparatus.

FIGS. 4A~4D respectively illustrate a flexible display with different medium infusing device according to embodiments of the present invention.

FIGS. 6A~6C, 7A~7C, 8A~8C, and 9 respectively illustrate different bonding between a flexible display panel and a flexible hollow supporting structure according to other embodiments of the present invention.

DESCRIPTION OF THE EMBODIMENTS

Figure 1A:
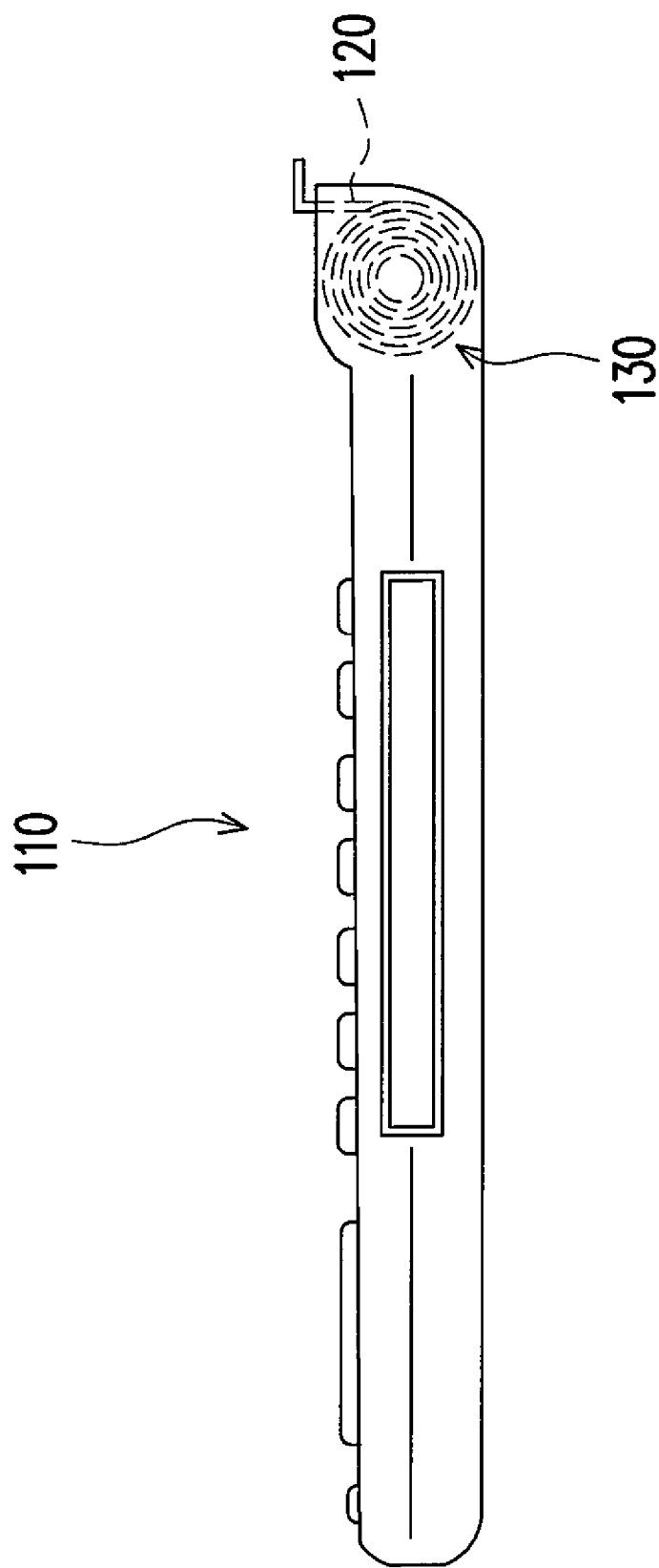
Figure 2:
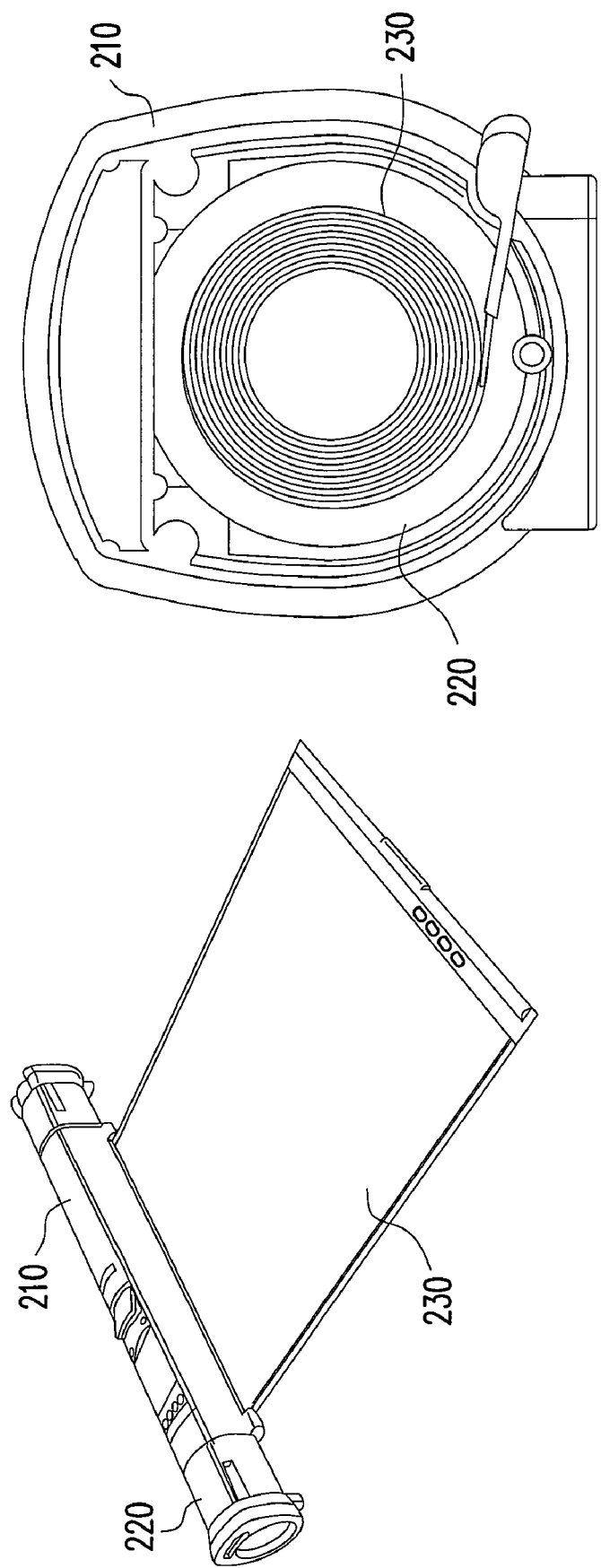
FIG. 2 illustrates a conventional retractable flexible display.

Reference will now be made in detail to the present preferred embodiments of the invention, examples of which are illustrated in the accompanying drawings. Wherever possible, the same reference numbers are used in the drawings and the description to refer to the same or like parts.

According to the present invention, a flexible hollow supporting structure is used in a flexible display for supporting the flexible display panel. The flexible hollow supporting structure can be fabricated in advance and then bonded with the flexible display panel. In addition, the fabrication of the flexible hollow supporting structure may also be integrated with the fabrication of the flexible display panel so that the fabrication process of the flexible display can be simplified. The flexible hollow supporting structure can be stored together with the flexible display panel since the hollow supporting structure is flexible. To use the flexible display, a supporting medium is infused in the flexible hollow supporting structure by a medium infusing device so that the flexible hollow supporting structure is stretched by the pressure and supports the flexible display panel. While not in use, the supporting medium is removed so that the flexible display panel regains its flexibility and can be stored conveniently.

Figure 3B:
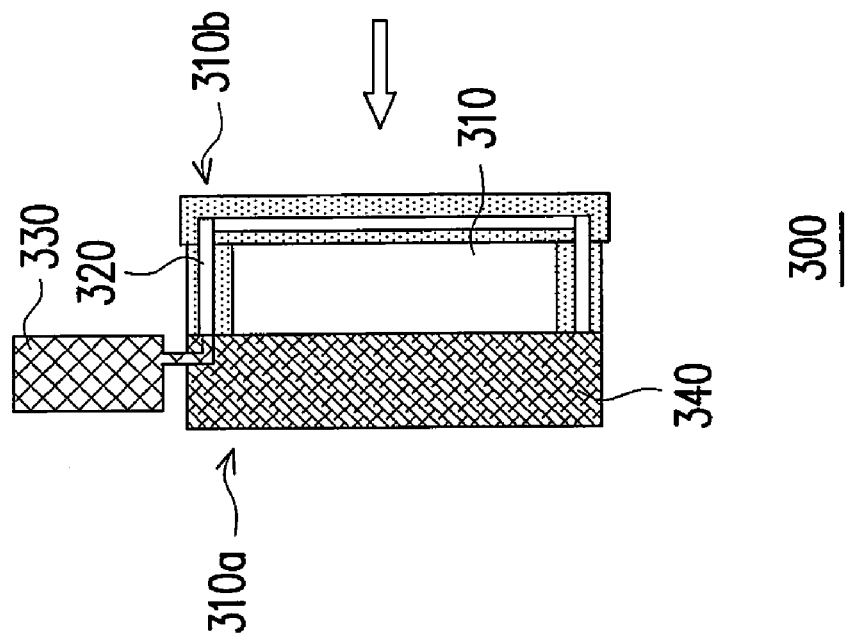
FIGS. 3A and 3B sequentially illustrate an interaction flow of a flexible display according to an embodiment of the present invention.
Figure 3A:
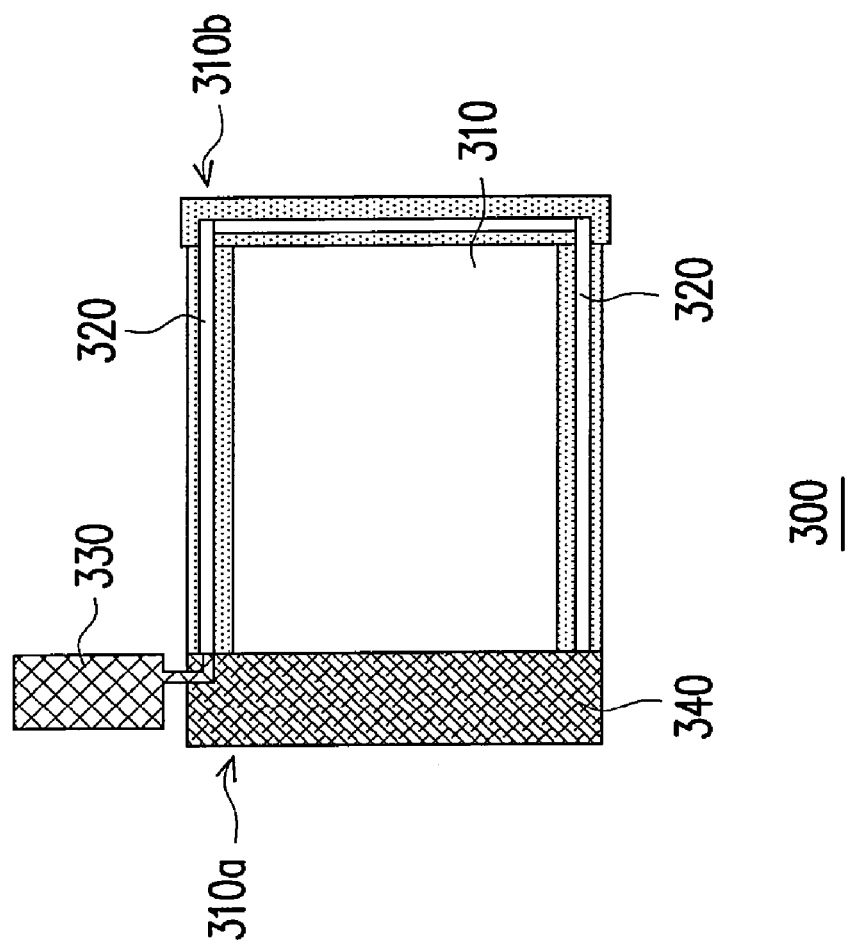

FIGS. 3A and 3B sequentially illustrate an interaction flow of a flexible display according to an embodiment of the present invention. As shown in FIGS. 3A and 3B, the flexible display 300 includes a flexible display panel 310, a flexible hollow supporting structure 320, and a medium infusing device 330. In addition, the flexible display 300 further includes a storage device 340 for storing the flexible display panel 310 while it is not in use. However, the storage device 340 is not necessary, which is used for providing additional protection and storage functions for the flexible display panel 310.

Referring to FIG. 3A again, the flexible hollow supporting structure 320 is bonded with the flexible display panel 310 and is located at both sides of the flexible display panel 310, and the flexible hollow supporting structure 320 extends from the first end 310a to the second end 310b of the flexible display panel 310, as shown in FIG. 3. Besides, the medium infusing device 330 is connected to the flexible hollow supporting structure 320 and is used for infusing a supporting medium into the flexible hollow supporting structure 320 so that the flexible hollow supporting structure 320 is stretched by the pressure from the supporting medium and accordingly spreads out the flexible display panel 310. In the embodiment, the material of the flexible hollow supporting structure 320 may be metal or polymer. To be specific, the material of the flexible hollow supporting structure 320 may be metal such as gold foil, stainless steel, aluminium alloy, or shape memory alloy, or may also be a polymer such as polyethersulfone (PES), polyimide (PI), polythiophene (PT), phenol novolac (PN), or polycarbonate (PC). In addition, the supporting medium may be a liquid or a gaseous substance, such as water or air. Next, as shown in FIG. 3B, when the flexible display panel 310 is to be stored, the supporting medium in the flexible hollow supporting structure 320 is removed, namely, the pressure in the flexible hollow supporting structure 320 is removed, so that the flexible display panel 310 regains its flexibility and can be folded or rolled up and stored in the storage device 340.

It should be mentioned here that the medium infusing device 330 in the present invention may be a manually-infusing, medium-storage-bottle-infusing, or pump-infusing device, or another other device which can achieve the same function. In addition, according to the present invention, the medium infusing device 330 may also be integrated with the storage device to consume less space. FIGS. 4A~4D respectively illustrate a flexible display with different medium infusing device according to embodiments of the present invention.

As shown in FIG. 4A, a user can blow a gaseous medium (for example, air) into the flexible hollow supporting structure 320 through a blowing pipe 332 so as to increase the pressure in the flexible hollow supporting structure 320 and stretch the flexible display panel 310 accordingly. While the flexible display panel 310 is not in use, the gaseous medium in the flexible hollow supporting structure 320 can be removed manually or by the restoring force of the storage device 340 for retracting the flexible display panel 310, so that the flexible display panel 310 can be retracted into the storage device 340 smoothly.

FIG. 4B illustrates a flexible display 300 having a manual button pump 334. The user can press down the manual button pump 334 to infuse gaseous or liquid supporting medium into the flexible hollow supporting structure 320, so as to increase the pressure in the flexible hollow supporting structure 320 and stretch the flexible display panel 310 accordingly. While the flexible display panel 310 is not in use, the supporting medium in the flexible hollow supporting structure 320 can be removed manually or by the restoring force of the storage device 340 for retracting the flexible display panel 310, so that the flexible display panel 310 can be retracted into the storage device 340 smoothly.

FIG. 4C illustrates a flexible display 300 having a medium storage bottle 336. The gaseous or liquid supporting medium can be infused into the hollow supporting structure 320 by the high pressure of the medium storage bottle 336, so as to increase the pressure in the flexible hollow supporting structure 320 and stretch the flexible display panel 310 accordingly. While the flexible display panel 310 is not in use, the supporting medium in the flexible hollow supporting structure 320 can be removed manually or by the restoring force of the storage device 340 for retracting the flexible display panel 310, so that the flexible display panel 310 can be retracted into the storage device 340 smoothly. The medium storage bottle 336 may recycle the supporting medium or may be an exchangeable medium storage bottle.

FIG. 4D illustrates a flexible display 300 having a pump 338 and a controller 339. The pump 338 may be driven electrically. The controller 339 can control the pump 338 to infuse gaseous or liquid supporting medium into the flexible hollow supporting structure 320, so as to increase the pressure in the flexible hollow supporting structure 320 and stretch the flexible display panel 310 accordingly. While the flexible display panel 310 is not in use, the supporting medium in the flexible hollow supporting structure 320 can be removed manually or by the restoring force of the storage device 340 for retracting the flexible display panel 310, or the supporting medium can be pumped out reversely by the pump 338, so that the flexible display panel 310 can be retracted into the storage device 340 smoothly.

As described above, in the present invention, the user can hold the flexible display with one hand to infuse the supporting medium, therefore it is convenient to use and the flexible display panel can be spread out quickly. Below, the bonding between the flexible display panel and the flexible hollow supporting structure will be described with several embodiments of the present invention. It should be noted here that in following embodiments, like reference numerals refer to like components throughout, therefore repeated description will be skipped, please refer to related embodiments for the description thereof.

Figure 5A:
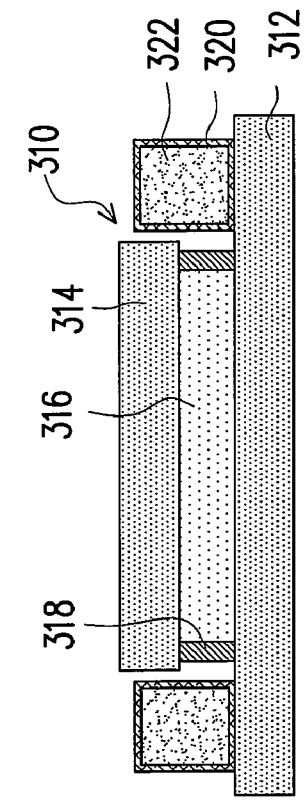
FIGS. 5A and 5B illustrate the bonding between a flexible display panel and a flexible hollow supporting structure and the interaction between the two according to an embodiment of the present invention.
Figure 5B:
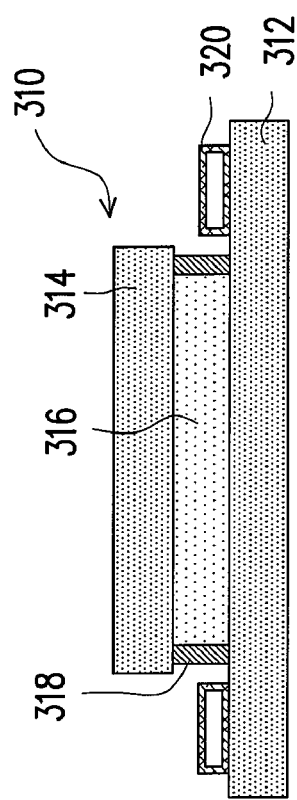

FIGS. 5A and 5B illustrate the bonding between a flexible display panel and a flexible hollow supporting structure and the interaction between the two according to an embodiment of the present invention. As shown in FIGS. 5A and 5B, the flexible display panel 310 includes a first flexible substrate 312, a second flexible substrate 314, and a display medium 316. The first flexible substrate 312 and the second flexible substrate 314 are opposite to each other, and a display medium 316 is disposed between the first flexible substrate 312 and the second flexible substrate 314. Here the display medium 316 may be a common liquid crystal or other materials used by displays. In addition, the material of the first flexible substrate 312 or the second flexible substrate 314 may be plastic material such as PES, PI, PT, PN, or PC, or other suitable polymer. Besides, a sealant 318 may be further disposed between the first flexible substrate 312 and the second flexible substrate 314 if the display medium 316 is liquid crystal. The sealant 318 is disposed at the periphery of the display medium 316 and is used for sealing the display medium 316 between the first flexible substrate 312 and the second flexible substrate 314.

Referring to FIGS. 5A and 5B, in the present embodiment, the second flexible substrate 314 and the flexible hollow supporting structure 320 are disposed at the same side of the first flexible substrate 312, and the flexible hollow supporting structure 320 is located at the periphery of the second flexible substrate 314. When the flexible hollow supporting structure 320 is filled up with the supporting medium 322, the flexible hollow supporting structure 320 stretches under the pressure of the supporting medium 322, and further, spreads the flexible display panel 310 out for the user to watch. While the flexible display panel 310 is not in use, the supporting medium 322 in the flexible hollow supporting structure 320 can be removed, and the flexible display panel 310 is retracted by the storage device 340 as illustrated in FIGS. 3A~3B and 4A~4D.

FIGS. 6A~6C, 7A~7C, 8A~8C, and 9 respectively illustrate different integrating manners between a flexible display panel and a flexible hollow supporting structure according to other embodiments of the present invention. Referring to FIG. 6A, the flexible hollow supporting structure 320 may be disposed on the external surface of the second flexible substrate 314, namely, on the top surface of the second flexible substrate 314. In addition, FIGS. 6B and 6C respectively illustrate the design of disposing the flexible hollow supporting structure 320 on the external surface (bottom surface) of the first flexible substrate 312 and the design of disposed flexible hollow supporting structures 320 on the external surfaces of both the first flexible substrate 312 and the second flexible substrate 314.

Besides disposing the flexible hollow supporting structure 320 on the surface of the flexible display panel 710, FIGS. 7A~7C respectively illustrate the designs of disposing the flexible hollow supporting structure 320 inside the flexible display panel 310. Referring to FIG. 7A, the flexible hollow supporting structure 320 may be located at the periphery of the display medium 316 and is fabricated integrally with the second flexible substrate 314. Those steps for fabricating the flexible hollow supporting structure 320 are skipped in such an integral fabrication process, therefore the fabrication flow is simplified and the fabrication cost is reduced. In addition, FIGS. 7B and 7C respectively illustrate the design of fabricating the flexible hollow supporting structure 320 in the first flexible substrate 312 and the design of fabricating flexible hollow supporting structures 320 in both the first flexible substrate 312 and the second flexible substrate 314.

Besides, according to the present invention, hollow substrates may also be used directly as the first flexible substrate and the second flexible substrate, as shown in FIGS. 8A~8C. Referring to FIG. 8A, the second flexible substrate 314 may be a hollow substrate which has a chamber as the flexible hollow supporting structure 320 described above. In addition, FIGS. 8B and 8C respectively illustrate the design of the first flexible substrate 312 being a hollow substrate and the design of the first flexible substrate 312 and the second flexible substrate 314 both being hollow substrates.

Figure 9:
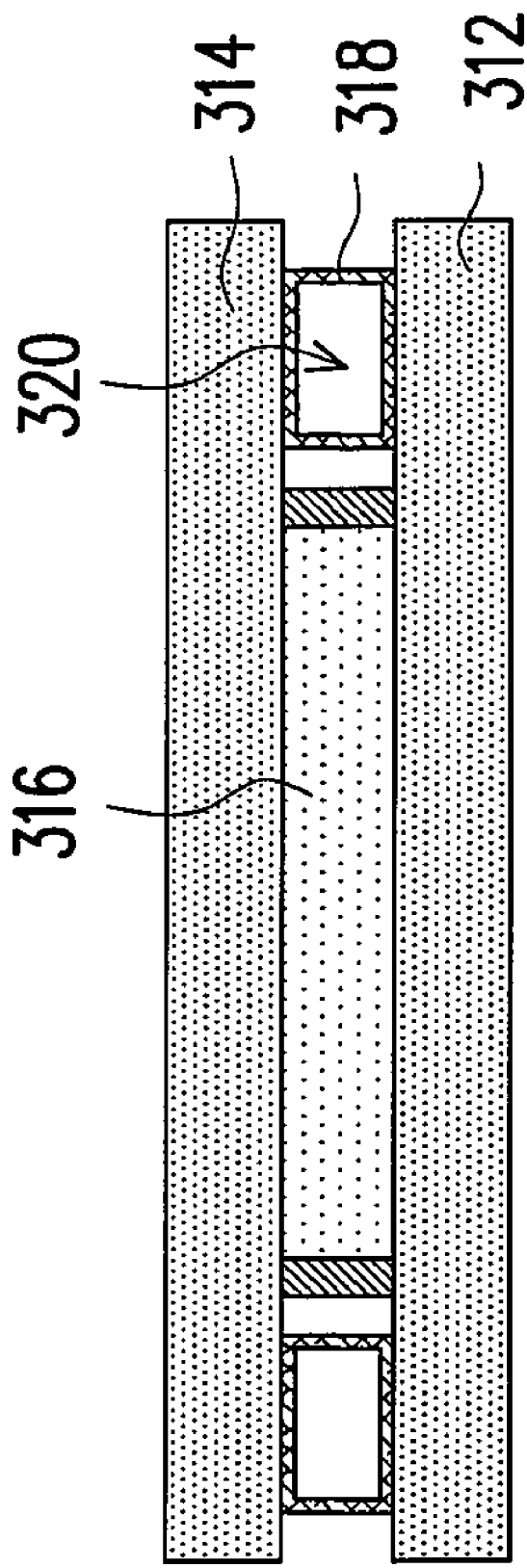

According to the present invention, the fabrication of the flexible hollow supporting structure may also be integrated with the sealant fabrication process of the flexible display panel. Referring to FIG. 9, a sealant 318, which has a chamber to be filled with supporting medium and the function of bonding the upper and lower substrates, is formed when sealant process is performed to the first flexible substrate 312 and the second flexible substrate 314, and the sealant 318 is used as the flexible hollow supporting structure 320 described above.

The bonding between the flexible display panel and the flexible hollow supporting structure are has been described in foregoing embodiments of the present invention. However, foregoing embodiments are not intended for limiting the number, position, and possible formation method of the flexible hollow supporting structure. Those having ordinary knowledge in the art should be able to form the flexible hollow supporting structures of appropriate number on appropriate positions according to the embodiments described above without departing from the scope and spirit of the present invention, so as to achieve the optimal design.

In foregoing embodiments, the shape of the flexible hollow supporting structure is changed for supporting the flexible display panel by infusing a supporting medium in the flexible hollow supporting structure. It should be noted that in other embodiments of the present invention, the medium infusing device may be further skipped, and the flexible hollow supporting structure is stretched through changes in the status of the supporting medium. To be specific, presently, there are many substances which have their statuses and volumes change along with such external factors as temperature and light irradiation. Air, water, liquid crystal, thermoplastic polymers such as rubber, silicone, and nylon, and thermosetting polymers such as epoxy resin, polyester, polyimide, polystyrene, and polyvinyl chloride, all belong to this category.

Accordingly, one of foregoing substances can be used as a supporting medium which is sealed in the flexible hollow supporting structure when or after the flexible hollow supporting structure is fabricated. Accordingly, a user can change state or volume of the supporting medium in the flexible hollow supporting structure by changing or supplying foregoing factors and so stretch the flexible hollow supporting structure for spreading out the flexible display panel. With such a design, the structure design of the flexible display in the present invention is further simplified, and the fabrication cost thereof is reduced, moreover, both the volume and weight of the product can be reduced.

In summary, a simple flexible hollow supporting structure is adopted in the present invention for supporting a flexible display panel; therefore the flexible display panel can be spread out through the change of the supporting medium or a simple and quick medium infusing action. Since no complicated supporting device is used in the present invention for supporting the display panel, the structure of the flexible display is simplified, and both the space consumption and product weight are reduced. The fabrication process of the flexible hollow supporting structure in the present invention is very simple and is integrated with fabrication process of the flexible display panel, therefore no additional equipment or material cost is requested, so that the fabrication cost is reduced. On the other hand, with the design of the present invention, a user can hold the flexible display with a single hand for infusing the supporting medium or changing the status of the supporting medium so as to spread out the flexible display panel, therefore the flexible display panel in the present invention is very convenient to use.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A flexible display, comprising:
   a flexible display panel, having a first end and a second end opposite to each other; and
   a flexible hollow supporting structure, integrated with the flexible display panel, extending from the first end to the second end, wherein a supporting medium can be infused into the flexible hollow supporting structure so as to stretch and support the flexible display panel by changing the pressure in the flexible hollow supporting structure, and the supporting medium is a gaseous substance or a liquid substance.

2. The flexible display according to claim 1 further comprising a medium infusing device connected to the flexible hollow supporting structure, the medium infusing device being used for infusing the supporting medium into the flexible hollow supporting structure so that the flexible hollow supporting structure can support the flexible display panel.

3. The flexible display according to claim 2, wherein the medium infusing device is a manually-infusing, medium-storage-bottle-infusing, or pump-infusing device.

4. The flexible display according to claim 1, wherein the flexible display panel comprises:
   a first flexible substrate;
   a second flexible substrate, opposite to the first flexible substrate; and
   a display medium, disposed between the first flexible substrate and the second flexible substrate.

5. The flexible display according to claim 4, wherein the display medium comprises liquid crystal.

6. The flexible display according to claim 4, wherein the flexible display panel further comprises a sealant disposed at the periphery of the display medium, and the sealant being connected to the first flexible substrate and the second flexible substrate in order to seal the display medium.

7. The flexible display according to claim 6, wherein the flexible hollow supporting structure is located inside the sealant.

8. The flexible display according to claim 7, wherein the flexible hollow supporting structure and the sealant are formed integrally.

9. The flexible display according to claim 4, wherein the flexible hollow supporting structure is located on at least one of the first flexible substrate and the second flexible substrate.

10. The flexible display according to claim 9, wherein the flexible hollow supporting structure and the second flexible substrate are located at the same side of the first flexible substrate, and the flexible hollow supporting structure is located at the periphery of the second flexible substrate.

11. The flexible display according to claim 9, wherein the flexible hollow supporting structure and the second flexible substrate are respectively located at different side of the first flexible substrate.

12. The flexible display according to claim 4, wherein the flexible hollow supporting structure is located in at least one of the first flexible substrate and the second flexible substrate.

13. The flexible display according to claim 12, wherein the flexible hollow supporting structure and the first flexible substrate, or the flexible hollow supporting structure and the second flexible substrate are formed integrally.

14. The flexible display according to claim 4, wherein the material of the first flexible substrate or the second flexible substrate comprises polymer.

15. The flexible display according to claim 4, wherein the material of the first flexible substrate or the second flexible substrate comprises polyethersulfone (PES), polyimide (PI), polythiophene (PT), phenol novolac (PN), or polycarbonate (PC).

16. The flexible display according to claim 1, wherein the material of the flexible hollow supporting structure comprises metal or polymer.

17. The flexible display according to claim 1, wherein the material of the flexible hollow supporting structure comprises gold foil, stainless steel, aluminum alloy, shape memory alloy, PES, PI, PT, PN, or PC.

18. The flexible display according to claim 1, wherein the supporting medium comprises air, water, liquid crystal, thermoplastic polymer, or thermoset polymer.

19. The flexible display according to claim 1 further comprising a storage device disposed at the first end of the flexible display panel for storing the flexible display panel.

20. A flexible display, comprising:
   a flexible display panel, having a first end and a second end opposite to each other; and
   a flexible hollow supporting structure, integrated with the flexible display panel, extending from the first end to the second end, wherein a supporting medium can be infused into the flexible hollow supporting structure so as to stretch and support the flexible display panel by changing the pressure in the flexible hollow supporting structure, and the flexible display panel comprises:
      a first flexible substrate;
      a second flexible substrate, opposite to the first flexible substrate;
      a display medium, comprising liquid crystal and disposed between the first flexible substrate and the second flexible substrate; and
      a sealant, disposed at the periphery of the display medium, and the sealant being connected to the first flexible substrate and the second flexible substrate in order to seal the display medium, wherein the flexible hollow supporting structure is located inside the sealant.

21. The flexible display according to claim 20, wherein the flexible hollow supporting structure and the sealant are formed integrally.

* * * * *